(12) United States Patent
Schoinas et al.

(10) Patent No.: US 9,304,964 B2
(45) Date of Patent: Apr. 5, 2016

(54) SEPARABLE TRANSPORT LAYER IN CACHE COHERENT MULTIPLE COMPONENT MICROELECTRONIC SYSTEMS

(75) Inventors: Ioannis T. Schoinas, Portland, CA (US); Doddaballapur Narasimha-Murthy Jayasimha, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1689 days.

(21) Appl. No.: 11/479,922

(22) Filed: Jun. 30, 2006

(65) Prior Publication Data
US 2008/0005346 A1    Jan. 3, 2008

(51) Int. Cl.
G06F 15/16    (2006.01)
G06F 15/173   (2006.01)
H04L 12/707   (2013.01)
H04L 12/703   (2013.01)

(52) U.S. Cl.
CPC .............. *G06F 15/173* (2013.01); *H04L 45/22* (2013.01); *H04L 45/28* (2013.01)

(58) Field of Classification Search
CPC ........ H04L 47/12; H04L 69/325; H04L 47/26
USPC ........................................................ 709/203
See application file for complete search history.

(56) References Cited

U.S. PATENT DOCUMENTS

| | | | | |
|---|---|---|---|---|
| 6,081,900 | A * | 6/2000 | Subramaniam | G06Q 20/382 707/999.01 |
| 6,480,507 | B1 * | 11/2002 | Mercer et al. | 370/469 |
| 7,035,214 | B1 * | 4/2006 | Seddigh et al. | 370/231 |
| 7,543,115 | B1 * | 6/2009 | Batson | G06F 12/0828 711/140 |
| 2001/0043609 | A1 * | 11/2001 | Chapman | H04L 12/4633 370/401 |
| 2002/0129029 | A1 * | 9/2002 | Warner | G06F 11/1443 |
| 2004/0003127 | A1 * | 1/2004 | Hensbergen | H04L 47/12 709/251 |
| 2004/0100961 | A1 * | 5/2004 | Sprague et al. | 370/392 |
| 2004/0131082 | A1 * | 7/2004 | Evans et al. | 370/469 |
| 2004/0138786 | A1 * | 7/2004 | Blackett | G01D 4/00 700/295 |
| 2004/0193329 | A1 * | 9/2004 | Ransom | H04L 63/20 700/286 |
| 2005/0025194 | A1 * | 2/2005 | Adjakple | H04W 56/0015 370/516 |
| 2005/0138261 | A1 * | 6/2005 | Marushak | G06F 13/4045 710/316 |
| 2005/0144437 | A1 * | 6/2005 | Ransom | G06F 1/28 713/151 |
| 2005/0265353 | A1 * | 12/2005 | Sengupta et al. | 370/395.52 |
| 2006/0204005 | A1 * | 9/2006 | Hassan | H04L 9/088 380/44 |
| 2007/0011333 | A1 * | 1/2007 | Lau et al. | 709/227 |
| 2007/0133415 | A1 * | 6/2007 | Spink | H04L 47/10 370/235 |
| 2007/0277223 | A1 * | 11/2007 | Datta | G06F 21/53 726/2 |

OTHER PUBLICATIONS

Wolf-Dietrich Weber, et. al., "The Mercury Interconnect Architecture: A Cost-Effective Infrastructure for High-Performance Servers", 5 Pages, 98-107.

* cited by examiner

*Primary Examiner* — Richard G Keehn
*Assistant Examiner* — Mohammed Ahmed
(74) *Attorney, Agent, or Firm* — Blakely, Sokoloff, Taylor & Zafman LLP (57) ABSTRACT

A separable Transport Layer is described in the context of cache coherent multiple component micro-electronic systems. In one example, a packet is received from a source component, the packet containing a Protocol Layer. A Transport Layer is attached to the packet and the packet is sent across a component communications interface to a second component, the packet containing the Transport Layer and the Protocol Layer.

25 Claims, 5 Drawing Sheets

SEPARABLE TRANSPORT LAYER IN CACHE COHERENT MULTIPLE COMPONENT MICROELECTRONIC SYSTEMS

FIELD

The present description relates to coherent interconnection links in multiple processor communication systems, and in particular to an additional layer to provide explicit confirmation of received data packets.

BACKGROUND

For years, computer systems with more than one microprocessor would use a host bus that is shared by the processors and the supporting chipset. The processors and the chipset, for example an input/output controller hub or memory controller hub would all connect to the same bus and the bus might also include cache memory or maybe even graphics. Increasingly, computer systems are being built with point-to-point links between the processors and with the chipset instead of the shared connections. This is done not only in high power workstation computers, but also in multiprocessor server computers. With a point-to-point link, a coherent interface may connect a microprocessor directly to another microprocessor. Another separate link may connect the microprocessor to the input/output or memory controller hub. Another link may connect the microprocessor to a third microprocessor. Where there is a small number of processors, such as 2 or 3, a point-to-point link can allow the link from each processor to be directly connected to another processor's link. The link may be built into each processor and already configured to be installed into and operate within a multiple processor computer system.

If, on the other hand, there are more than a very few processors, such a point-to-point link to each component becomes cumbersome. Also, in large scale workstation and server systems, where a very high degree of reliability is desired, a special chipset and a unique, typically proprietary, interface link definition is often used. The unique chipset and link add additional costs to the computer systems. While the additional layers required for higher reliability could be added to all microprocessors and chipsets, spreading the costs over a much larger volume of components, this would add cost and complexity to the smaller scale systems. It might also slow communications over the interface in systems that have very little extra margin for speed losses.

BRIEF DESCRIPTION OF THE FIGURES

The invention may be more fully appreciated in connection with the following detailed description taken in conjunction with the accompanying drawings, in which like reference numerals refer to corresponding parts throughout the several views of the drawings, and in which.

DETAILED DESCRIPTION

An added degree of reliability may be added to a small scale computer system's processor interface link by adding an optional Transport Layer to, for example, a point-to-point interconnect. OEMs (Original Equipment Manufacturers) that desire a higher degree of reliability may use a point-to-point interconnect with the Transport Layer in their components. OEMs that do not desire the higher reliability or the extra processing and communications overhead of the Transport Layer may ignore it. As described below, components that implement the Transport Layer may work seamlessly with components that do not. In a further development, components that implement the Transport Layer and those that don't may exist in the system simultaneously.

The Transport Layer provides support for end-to-end reliable transmission between two interconnected components each implementing this layer. It relies on the services provided by the Routing Layer below it, while, in turn, providing reliable transmission support to the Protocol Layer above it. The Transport Layer may be particularly valuable, for example, for inter-board traffic carried by cables. For intra-board signals carried on traces, the Transport Layer may also be used but, depending on the application, may not be necessary or desired.

Figure 1:
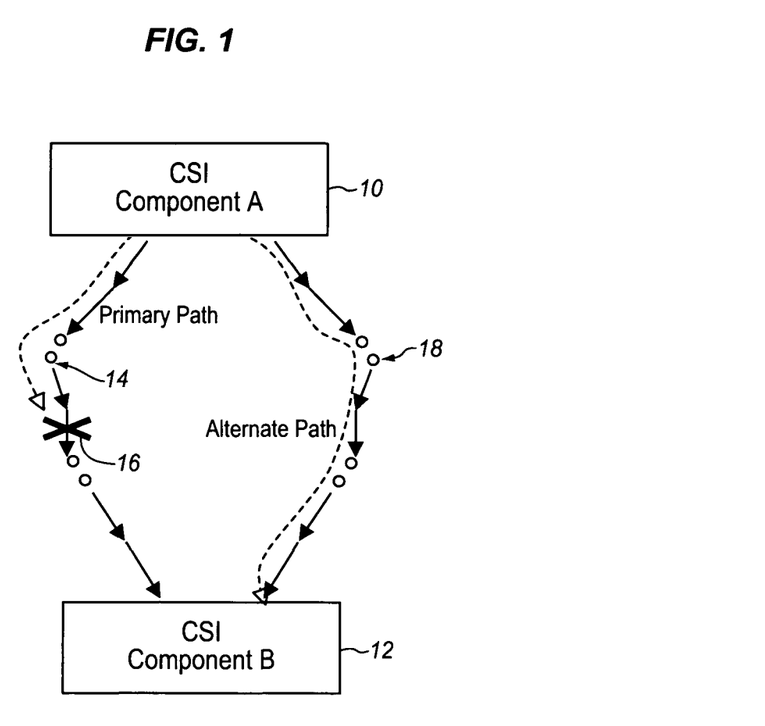
FIG. 1 is a block diagram of two components communicating through primary and alternate paths according to an embodiment of the invention.

FIG. 1 shows two components A 10 and B 12 which both implement the Transport Layer (FIG. 1). These components have a point-to-point interconnect to allow packets to be communicated between them. Embodiments of the present invention may be applied to many different component interconnect interfaces and protocols. The components may be processors, controllers, memory devices, or communications hubs.

If both components A and B implement the Transport Layer, then reliable end-to-end transmission from the sender component A to the destination component B is maintained without any intermediate connected components in between. The path from A to B to implement the Transport Layer, may be direct. The granularity for reliable transmission is a packet.

Consider at least two disjoint routable paths from A to B, a primary path 14 to the left and an alternate path 18 to the right. In a simple example, there are no failures along one of these paths, the Transport Layer mechanism guarantees the delivery of a packet originating at A and destined to B. In other words, the Transport Layer provides a mechanism against one or more failures along one of the disjoint paths. In general, between any two Transport Layer entities, the Transport Layer mechanism, described below, provides protection against a single point of failure.

If there is a failure along one of the paths, that is if a packet from A does not successfully arrive at B, then the Transport Layer may provide for retransmission. Transmission and retransmission may be based on a notion of Transport Layer retry (TLR). If component A determines that a packet that it sent to component B along the primary path may have been lost, then it may retransmit the packet to B until it succeeds or until, after a certain number of tries, it gives up.

A threshold may be used to limit the number of retries. Component A may then repeatedly resend the packet and keep track of the number of retries until the threshold is reached. At that point, the retries stop. In FIG. 1, the packet is first sent along the primary path 14, but there is a break in the path at some point 16. This may occur because the packet is routed on a path through a failed component. Packets may fail for many other reasons. The packet is then resent along an alternate path 18.

To allow for the retry mechanism, a timer may be used between retries to give enough time for the packet to be received and acknowledged. The time between two such transmissions may be referred to as a retry time out (tRTO). The sending component A may also have a buffer to store the packet for retransmission until A is guaranteed that the packet has been received at B.

The other side of the Transport Layer is an acknowledgment. The destination component B may acknowledge the receipt of each packet by sending a special acknowledgement response to A.

FIG. 1 shows two completely independent paths between components A and B. In that example, there are no single points of failure in the interconnect, because the Transport Layer agent is able to send a request down alternate paths. While these two independent paths may enhance reliability, only one path is needed to implement a Transport Layer. In a complete system, there may be some components that are connected with more than one path and other component interconnections that have only one path. The routing and configuration of the paths may be designed to suit a variety of different applications depending on the reliability desired as well as other factors such as packaging, cost constraints, performance demands, etc.

A packet in a point-to-point interconnect may contain a variety of different fields, depending on the particular message and the application to which the packet format has been adapted. The fields may include addresses, commands, parameters, data, operation codes, transaction requests and identifiers, and profile definitions. The particular type and arrangement of the fields is not important to the present description. In addition, while the present description is presented in the context of adding a Transport Layer to packets, the Transport Layer may be adapted to a variety of different types of packet formats and communications protocols.

The Transport Layer adds some fields to the communications protocol packet. The Transport Layer may include a 1) sequence number, 2) a transaction response field (Transport Layer Response or TLR), 3) a sender node identification (NodeID), and 4) a time-out field. The structure of the Transport Layer may be adjusted to suit a particular application, packet format, or communications protocol. More or fewer fields may be used and the positions of the fields may be moved to suit particular applications.

The sequence number field allows a unique sequence number to be associated with each packet sent from a source component to a destination component. For each source-destination pair, the sequence number may be unique as long as the packet is alive from the Transport Layer's point of view. Once the sender has received a confirmation that the packet has been consumed at the receiver, the sequence number may be retired and can be reused.

The sequence number identifies a packet in a sequence of packets, without counting the number of retries. The first transmission of a packet in a sequence may be labeled as 0. The next packet in the sequence may then be identified as 1, and the next packet with 2, and so on. When the same packet is resent, it may be sent with the same sequence number each time. This allows the recipient to identify the duplicate packets as such in the Transport Layer. Any number of other packet numbering schemes may be used as an alternative to this scheme depending on the implementation. For example, the first packet may not be labeled at all and the next packet labeled as 0. Various coded or nonsequential numbering schemes may also be used.

The sequence number field may have any number of bits depending on the particular application. The field width may be selected based on different design considerations. One consideration is to provide enough unique sequence numbers to prevent transactions from back pressuring into the Protocol Layer when unique sequence numbers run out. Another consideration is to provide enough sequence numbers to prevent wrap around within a packet's life time in the Transport Layer. In other words, there is a round trip time for the retry process that includes at least the time necessary for: a) a packet to be sent from the sender to the receiver, b) the sender to wait for and not receive an acknowledgment, c) the sender to determine that no acknowledgment is coming, d) the sender to retry the packet and e) the receiver to receive the retry. During this round trip time, additional packets are sent with additional sequence numbers. From the receiver's perspective, providing enough sequence numbers to accommodate the round trip time will help the Transport Layer at the receiver to recognize the retry as a retry and not as a duplicate of a later sent packet. Stated another way, the retry packet should be clearly recognizable as a never received packet and not as a duplicate of a later sent packet.

A time-out field may also be used in the packet header. Such an explicit time-out may be used to facilitate dropping "aged" packets in the interconnect. However, a time-out field may add additional overhead. Instead of an explicit time-out field, the support mechanisms to drop packets in order to prevent sequence number wraparound as described below may be used.

The wraparound constraint described above is implicit in the Transport Layer protocol. However, for greater flexibility it may be made explicit using another field or by embedding a constraint in another message. A wraparound constraint may be used to prevent a sequence number wraparound that could result in a destination component being unable to distinguish between a duplicate packet and a new packet. It may be permitted for the Transport Layer to stop accepting transactions from the Protocol Layer.

The transaction response field may be used for acknowledgments and similar messages as described in more detail below. The sender Node ID, indicates the source of the message and may be used as an address for sending acknowledgments. For some interfaces, the information in the NodeID field may be present elsewhere in the packet. Placing it in the Transport Layer allows it to be accessed within the Transport Layer which may be simpler in some embodiments. Other information may be accessed from the packet, as appropriate, depending on the circumstances.

In one embodiment, every packet has a sequence number field and a NodeID field. The TLR field may be optional. The TLR field is able to support a variety of different transaction response types, for example a Transport Layer Acknowledgment (TL_ACK) and a Transport Layer Negative Acknowledgment (TL_NACK).

These fields and transactions may be configured so that they are not visible to the Protocol Layer. In one embodiment, the Transport Layer ACKs and NACKs may be piggybacked along with the regular packets. The overall savings in interconnect bandwidth comes at the cost of increasing the packet header to accommodate the additional sequence number field and the ACK/NACK.

For routing, each Transport Layer component may have a set of unique protocol agents in its domain. The protocol agents associated with the Transport Layer component may be configured to launch Transport Layer transactions only from the one Transport Layer component and no other Transport Layer components in the system. Consequently, any packets targeted to a member of the set of unique protocol agents that use the Transport Layer are always routed through the one Transport Layer component. Such a Transport Layer component may be integrated into the same chip with its protocol agent or agents or provided in a separate package.

The TLR field may carry different Transport Layer responses. TL_ACK and TL_NACK may be treated as no data responses and routed in that message class with the underlying protocol. All other packets may be routed in the same manner as they would be without the Transport Layer.

In one embodiment, each Transport Layer request is acknowledged by the receiving component. This maximizes reliability at the expense of additional traffic overhead. When an acknowledgment is not received within tRTO (Retry Time Out), the packet is presumably lost and the sender retransmits the packet with the same sequence number as before (TLR). The number of retries may be selected to suit a particular application. As an alternative, only some packets are acknowledged. The determination of which packets to acknowledge may be set, for example, by the sender using a TLR field in the Transport Layer of the sent packet.

In some instances, a packet may be successfully received but the return acknowledgment may fail. The sender will nevertheless resend the packet for failure to receive the acknowledgment. This may result in a duplicate packet at the receiver. In one example, the receiver drops the second packet at the Transport Layer and does not pass it on to the Protocol Layer. The receiver may use the sequence number, for example, to identify the duplicate. When the sender retries the packet, it may be sent with the same sequence number as the original packet which was assumed to be lost.

For simplicity, the Transport Layer may be implemented with no explicit Transport Layer request transactions. Protocol Layer requests and responses may be used as implicit Transport Layer requests. As described above, at least two new response transactions unique to the Transport Layer may be defined.

The Transport Layer Acknowledgment (TL_ACK) is a response sent by the Transport Layer component acknowledging the error-free receipt of a Transport Layer request. The request may be considered to be implicit in the sending of a packet with a Transport Layer sequence number and NodeID. The response acknowledges the receipt of the request and identifies the request by the sequence number. It is directed to the component identified by the sender NodeID in the request.

In one embodiment, several Transport Layer requests may be acknowledged with one TL_ACK packet. By not acknowledging each Transport Layer request individually, communication resources are conserved for other packets. A range of requests may be acknowledged with a single response by tracking the sequence numbers and NodeIDs for a group of packets and then sending a single packet that indicates the range.

In one embodiment, for a particular source-destination pair, that is, a sender-receiver combination, an acknowledgement may be sent with the highest sequence number received since the last acknowledgement. The receiver will know if there were any gaps in the sequence based on gaps in the sequence of sequence numbers. So, for example, assume that a request with a sequence number S11 was previously received and acknowledged and then packets with sequence numbers S12-S32 are all successfully received.

The receiver may send a TL_ACK response with sequence number S32 directed to the source in order to acknowledge the receipt of all of the requests with sequence numbers in the range from S12-S32. More generally, if the sender receives a TL_ACK for S1 and then a TL_ACK for Sn, then this serves as an acknowledgement for packets from S1+1 to Sn(modulo 2k), where k is the width of the sequence number field in the packet. Acknowledging a range may cause the time between sending a packet and receiving an acknowledgement to increase. The width of the sequence number and any constraints on acknowledging ranges may be selected to avoid errors due to wraparound.

A Transport Layer Negative Acknowledgment (TL_NACK) may be used by a receiver to acknowledge an erroneous receipt of a Transport Layer request. The response "negatively acknowledges" the request identified by the sequence number and is directed to the component identified by the sender NodeID in the request. Such a transaction is not necessary for the Transport Layer because a sender may be configured to retransmit a message if it does not receive a TL_ACK response within the set tRTO. A TL_NACK message may be used, however, to cause the retries to happen sooner. If a packet is lost along the path, then the retry time out may be used, while if the packet is received at the receiver but somehow in error, then a TL_NACK may be used to stimulate the retry.

The NodeID may be implemented in different ways to suit a particular transaction. A direct NodeID may be inserted into the Transport Layer field supplied in the packet header to explicitly identify the sending component.

An indirect NodeID may be used if a protocol agent uses the sender NodeID. The Transport Layer component need not then be identified explicitly. The sender NodeID may refer to the NodeID of the originating Protocol Layer request or response corresponding to this Transport Layer request. Specific responsibilities may be imposed on both the sender and the receiver TL entities to avoid errors or misidentifications.

Figure 2:
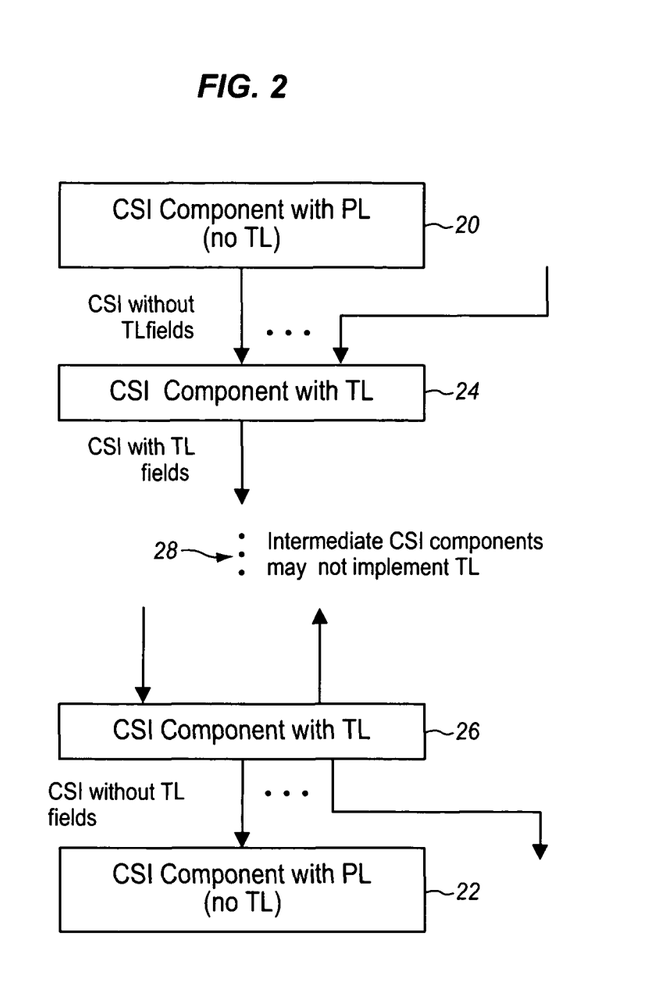
FIG. 2 is a block diagram of two components communicating through Transport Layer-enabled components according to an embodiment of the invention.

FIG. 2 shows an example of how packets may be communicated through a coherent inter-component interface with a Transport Layer. In FIG. 2, a first component 20 is shown as a sender without any Transport Layer functionality. A second component 22 is shown as a receiver without any Transport Layer functionality. These two components may communicate with each other in the usual manner without benefit of a Transport Layer. For example, the sending component may use routing tables and may use a sender NodeID field in the sent packets. In, some point-to-point interconnect protocols, a sender NodeID field is provided as an optional feature and may be used to send packets to the receiver component 22.

FIG. 2 further shows two further components, a first relay component 24 near the sender 20 and a second relay component 26 near the receiver 22. In contrast to the first two components, these implement the Transport Layer (TL) described above. To provide reliable end-to-end transmission between the first two components, these additional TL components may be interposed in the communication path between the first two. Such an interposition may be made seamlessly in that neither of the first two components 20, 22 require any modification in structure or operation in order to interoperate with the TL components. The routing tables, for example, do not change. Additional components 28 with and without a Transport Layer functionality may also be interposed between the first two components, between the second two components and between the components that use a Transport Layer and those that do not.

When the sender 20 sends a packet across the coherent interface to the receiver, it will be intercepted at the first TL component 24. At the first TL component, the packet, whether it be a Protocol Layer request or a response, may be converted into a Transport Layer request or response. The packet may also be buffered at this first relay component. To do this, the first TL component 24 may generate the TL header information by generating the information necessary for each field and adding the header to the intercepted packet. The NodeID field may be defined by a protocol agent or taken from explicit NodeIDs elsewhere in the packet. The sequence number may be generated using the first TL component's own sequence series or a sequence based on the sending component's 20 sequence. The transaction response field is not necessary for sent packets, however, it may be used for some applications.

The first TL component 24 then sends the packet with the Transport Layer attached across the coherent interface to the receiver 22. The packet may then be intercepted by the second TL component 26 that is near the receiver. If there are additional components 28 along the path, they may intercept the packet too, for a successful transmission, the packet will continue on its course unaffected. In one embodiment, there may be intermediate components that support the Protocol Layer but not the Transport Layer. These intermediate components may be configured to pass the packet header Transport Layer fields unmodified from the Transport Layer source to Transport Layer destination.

For the receiver without a Transport Layer to benefit from the reliability improvements offered by the Transport Layer, the second TL component is located sufficiently close to the receiver. The physical positioning of the various components may be adapted to suit any particular implementation.

The second TL component 26 determines whether the packet has arrived intact, then looks at the Transport Layer of the packet and generates a Transport Layer acknowledgment. If the packet does not arrive intact, then the acknowledgement may be a negative acknowledgment. The receiver then sends a TL_ACK or TL_NACK back to the sender based on the NodeID in the Transport Layer. The receiving TL component 26 then routes the packet to the non-TL equipped and intended recipient, the first receiver 22.

The TL-equipped receiver may perform some additional tests to see whether the packet satisfies other conditions. The particular tests may depend upon the particular application to which the TL is applied. The receiving TL component or node may, for example, check the sequence number field of the Transport Layer to determine whether the packet is a duplicate.

The sender NodeID, in the example above, corresponds to the original sender's 20 NodeID, not the TL enabled sender's 22 NodeID. However, the routing may be modified so that the sender NodeID is for the TL components and the ultimate sender and receiver are identified in another way. For example, if the sender NodeID is not defined at the Protocol Layer component, then each Transport Layer component may have a unique NodeID which is then used as the sender NodeID in the outgoing Transport Layer request. In such a case, TL_ACKs and TL_NACKs are targeted explicitly to the TL components 24, 26, and not to the ultimate sender and receiver 20, 22.

In the present example, the route between the ultimate sender and receiver is configured to pass through the TL enabled sender and receiver. The TL enabled components also are configured to act as proxies for their respective ultimate senders and receivers. The TL enabled sender can then receive, for example the TL_ACKs and TL_NACKs and generate an appropriate response based on packets stored in its buffer.

Figure 3:
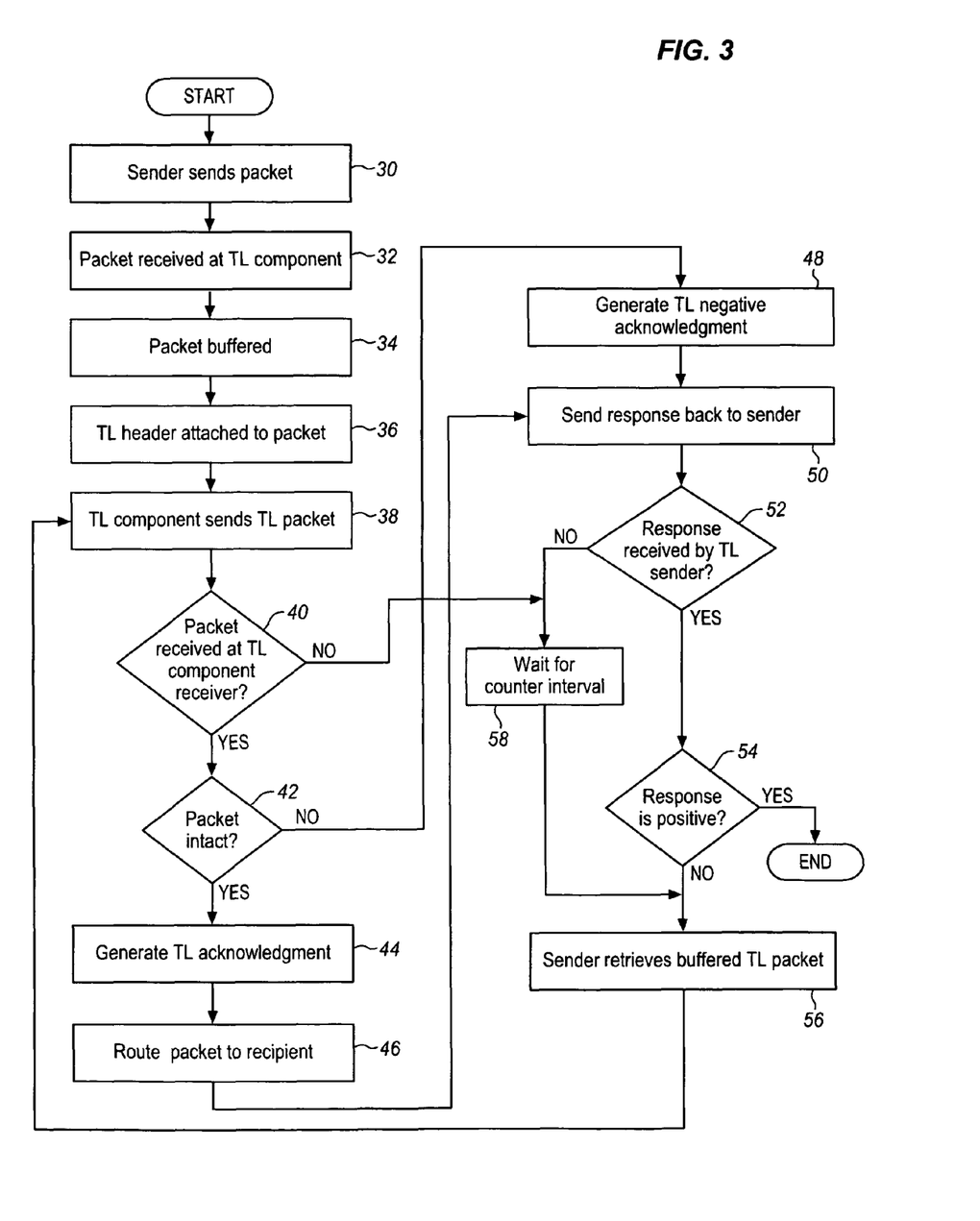
FIG. 3 is a process flow diagram of reliably sending packets on a communications interface according to an embodiment of the invention.

FIG. 3 shows an example process flow of using a Transport Layer as described with respect to FIGS. 1 and 2 above. First, at block 30, the sender 20 sends a packet across the coherent interface in the direction of a designated receiver 22. The packet is received at a Transport Layer component at block 32. The TL component may be part of the same component as the sender or a separate discrete component. At the TL components at block 34, the packet is buffered and at block 36, a TL header is generated and attached to the packet, converting it into a Transport Layer request or response. The TL header as described above may include a transaction response field, a NodeID field and a sequence# field. Other fields may also be used and neither of these fields is required. The Transport Layer enabled component 24 then sends the packet at block 38 with the Transport Layer attached across the coherent interface toward the designated recipient.

If the packet is successful, at block 40, it is received at a TL component receiver 26. The TL component receiver determines at block 42 whether the packet has arrived intact. If so, then it generates a Transport Layer acknowledgment at block 44 and routes the packet to the non-TL equipped and intended recipient, the first receiver 22, at block 46. The TL component may remove the Transport Layer header or not before sending it to the recipient, depending on the implementation. As with the sending TL component, the receiving TL component may be a part of the receiver or a discrete component.

If the packet does not arrive intact, then the TL component generates a negative acknowledgment at block 48. The receiver then sends the response back to the sender at block 50, based on the NodeID in the Transport Layer. The response is received by the TL sender component at block 52. If the response is a positive acknowledgment, then at block 54, the Transport Layer process ends. If the response is a negative acknowledgment, then the sender retrieves the corresponding buffered packet at block 56 and resends it including the appropriate TL header as at block 38. In the described embodiment, the sender resends exactly the same packet with exactly the same header, but the packet or its header may be modified for some applications. The resent packet is treated in the same way as the original packet at block 38. As mentioned above, a retry counter may be activated to limit the number of attempts to send the packet.

Until the sender receives the response, it continues to operate a counter. After the appropriate amount of time, at block 58, if no response is received from the TL component receiver, then the TL component sender will return to block 56 to retrieve the buffered packet and then resend the packet. As mentioned above, the number of retries may be limited using a counter or other mechanism.

Figure 4:
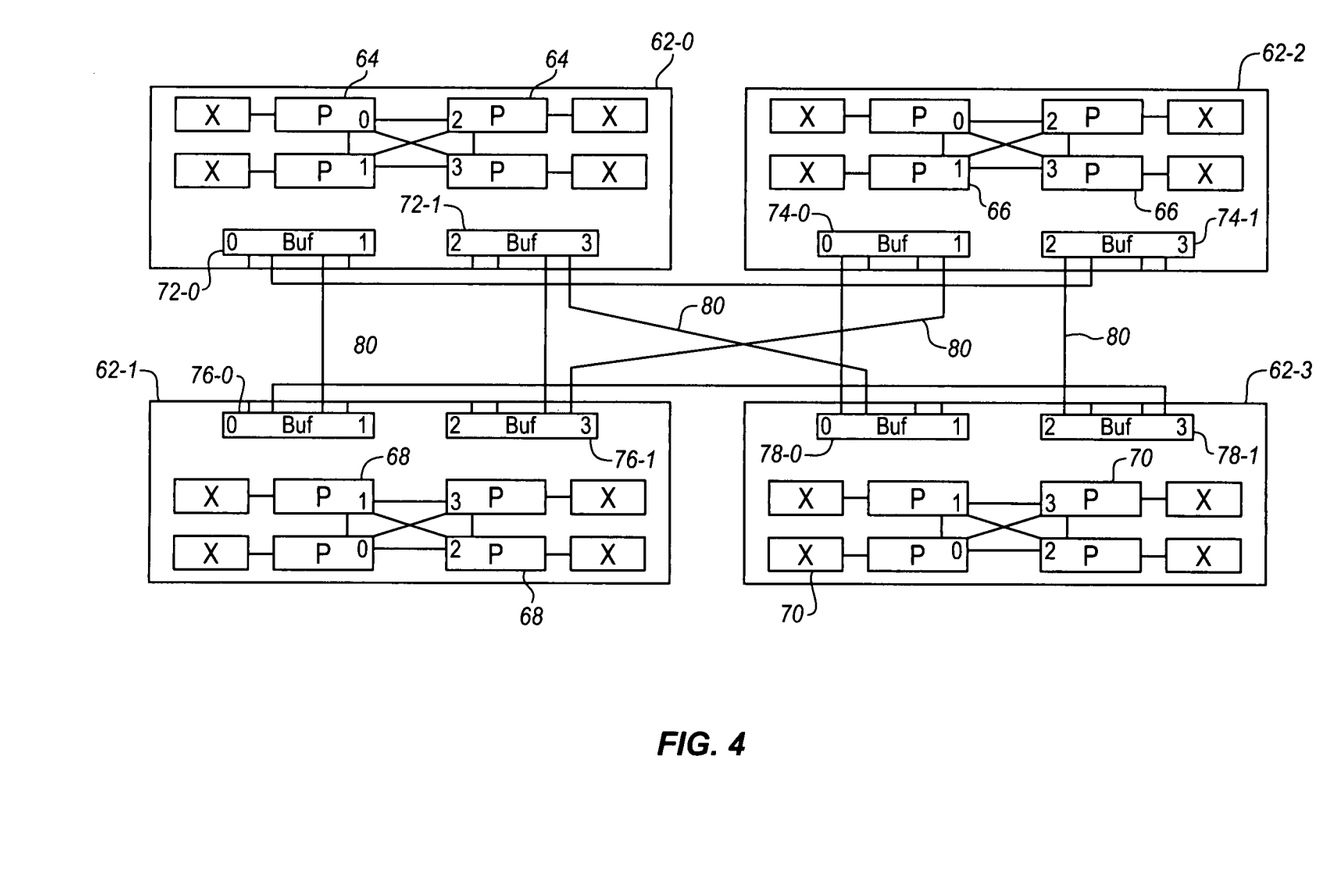
FIG. 4 is a block diagram of a computer system with communications buses suitable for implementing embodiments of the present invention.

FIG. 4 shows an example of a multiple component system using TL components and components without a Transport Layer as an example of possible arrangements for communicating components. In FIG. 4, there are four printed circuit boards (PCB) 62-0, 62-1, 62-2, 62-3. Each PCB carries a group of four interconnected microprocessors 64-0, 64-1, 64-2, 64-3, 66-0, 66-1, 66-2, 66-3, 68-0, 68-1, 68-2, 68-3, 70-0, 70-1, 70-2, 70-3. While microprocessors are shown, any other type of microelectronic device may be used. In addition, the devices are not necessarily all of the same type or kind, so that different types of devices may be carried by each PCB or by a single PCB. The microprocessors are each connected to each other microprocessor by a group of dedicated communication channels. In the illustrated example, each microprocessor has a discrete link to each other microprocessor on the board. However, connections may be made through other components as may be desired for a particular application. The microprocessors are also shown as being connected to other components, indicated generally as X. These components may be memory, hubs, I/O devices or any other component or components.

Each PCB also has two cable buffers 72-0, 72-1, 74-0, 74-1, 76-0, 76-1, 78-0, 78-1. The buffers connect to data communications cables 80 that connect the PCBs to each other. The cables allow microprocessors on each PCB to communicate with the microprocessors on each other PCB. As shown in FIG. 4, each buffer connects to two other PCBs and each PCB has two buffers so that there is a path from each PCB to each other PCB. The buffers also connect to each microprocessor using circuit board traces or another connector (not shown).

In the example of FIG. 4, the buffers may operate as Transport Layer enabled relay components similar to the TL components 24, 26 of FIG. 2, while the microprocessors operate without a Transport Layer similar to the sending and receiving components 20, 22 of FIG. 2. In this configuration, the microprocessors can communicate with other microprocessors on the same PCB without the additional overhead of a Transport Layer. For communications through the cables, however, the extra reliability of the Transport Layer may be used. Alternatively, the Transport Layer may be used for some cables but not for others. The configuration of FIG. 4 is provided as an example. A variety of modifications may be made depending on the particular application.

Figure 5:
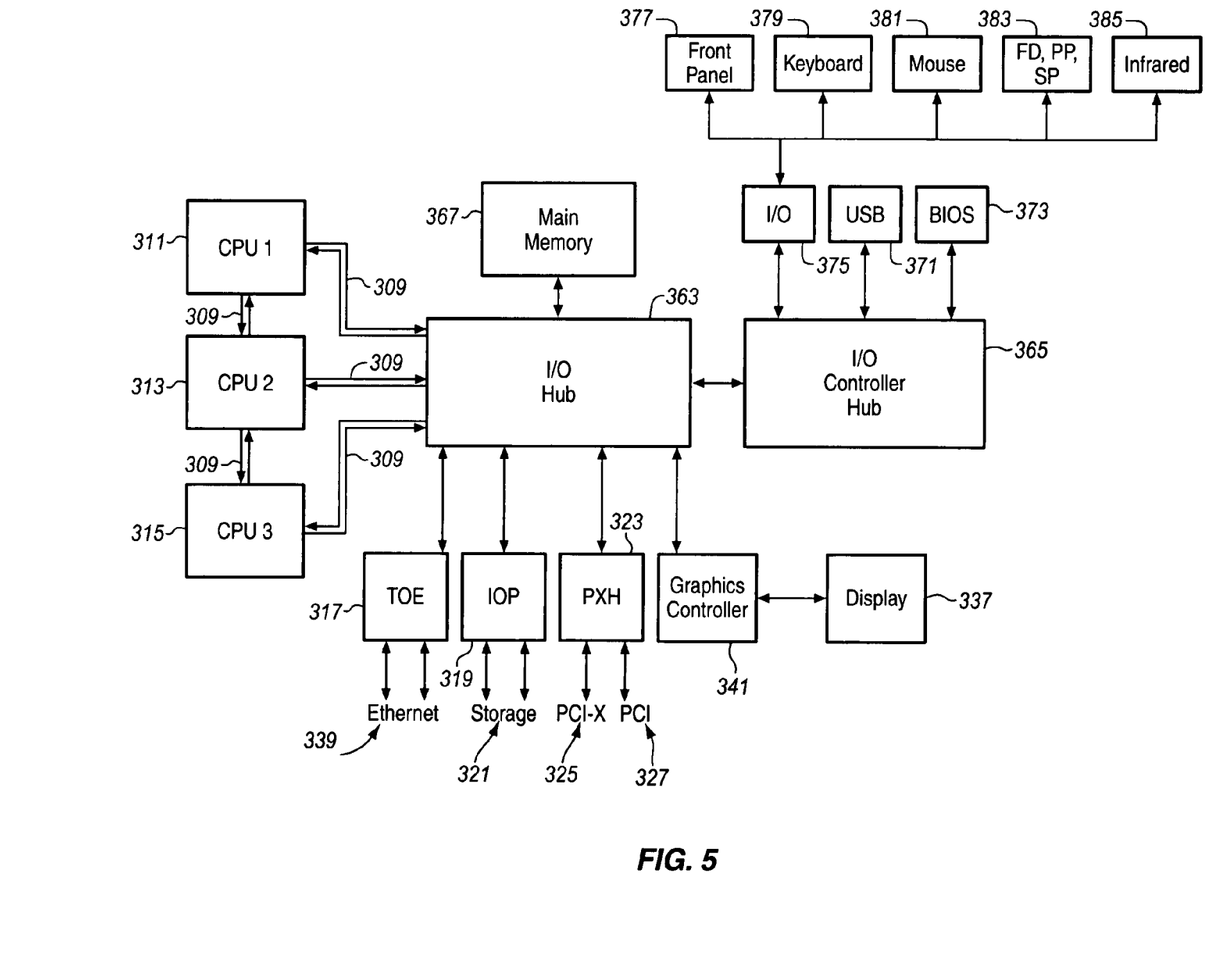
FIG. 5 is a block diagram of another computer system with communications buses suitable for implementing embodiments of the present invention.

FIG. 5 shows an example of a computer system suitable for implementing the present invention. An IOH (Input/Output Hub), north bridge, or host controller 363 interfaces one or more CPUs (central processing unit) with memory and I/O devices and may provide a wide range of other features such as increased performance, reliability, availability and serviceability, and system management. It may include I/O clusters, a memory controller, snoop filters, and a wide range of logic for handling transactions. While the example of FIG. 5, includes a microprocessor coupled to an IOH and an ICH (Input/Output Controller Hub), either the IOH or the ICH or both or any of the functions of these chips may be incorporated into any one or more of the microprocessors. The IOH and the ICH may also be combined, in whole or in part, inside of or outside of the microprocessor.

In the example of FIG. 5, the IOH 363 has a point-to-point interconnect link 309 for each of three CPUs or processor cores 311, 313, 315. More or less than one IOH, three processor cores and links may be used. As shown in the diagram, CPU1 has a direct link to CPU 2 and the IOH, but CPU 1 and CPU 3 communicate only through CPU 2 or the IOH. An additional link may be provided to allow CPU 1 and CPU 3 to communicate with each other directly. Alternatively, links may be removed so that all of the CPUs communicate through one of the other CPUs or the IOH.

The IOH provides additional connectivity to other devices. There is an interface to system memory 367, such as DIMMs (Dual In-line Memory Modules) in which instructions and data may be stored, and a high speed interface, such as PCI (peripheral component interconnect) Express. The PCI Express interface may be used to couple to a variety of different high and low speed devices. In the example of FIG. 5, six PCI Express×4 lanes are shown. Two lanes connect to a TCP/IP (Transmission Control Protocol/Internet Protocol) Offload Engine 317 which may connect to network or TCP/IP devices such as a Gigabit Ethernet controllers 339. Two lanes connect to an I/O Processor node 319 which can support storage devices 321 using SCSI (Small Computer System Interface), RAID (Redundant Array of Independent Disks) or other interfaces. Two more lanes connect to a PCI translator hub 323 which may support interfaces to connect PCI-X 325 and PCI 327 devices. Two, four or more lanes of PCI Express couple to a graphics controller 341 to render images or video on a display 337. The PCI Express interface may support more or fewer devices than are shown here. In addition, the IOH may be adapted to support other protocols and interfaces instead of, or in addition to those described.

The IOH may also be coupled, using PCI Express or another bus to an ICH. The ICH 365 offers possible connectivity to a wide range of different devices. Well-established conventions aid protocols may be used for these connections. Alternatively, these connections may be provided using the PCI interface 327 or another interface. The connections may include a SIO (Super Input/Output) port 375, a USB hub 371, and a local BIOS (Basic Input/Output System) flash memory 373. The SIO (Super Input/Output) port 375 may provide connectivity for a front panel 377 with buttons and a display, a keyboard 379, a mouse 381, and infrared devices 385, such as IR blasters or remote control sensors. The I/O port may also support floppy disk, parallel port, and serial port connections 383. Alternatively, any one or more of these devices may be supported from a USB, PCI or any other type of bus or interconnect. Wireless interfaces such as Bluetooth and WiFi may also be supported from any one or more of these busses.

The particular nature of any attached devices may be adapted to the intended use of the device. Any one or more of the devices, buses, or interconnects may be eliminated from this system and others may be added. For example, video may be provided on the PCI bus, on an AGP bus, through the PCI Express bus or through an integrated graphics portion of the host controller or a processing core.

It is to be appreciated that a lesser or more equipped component communication protocol, Transport Layer message structure, retry protocol, communications bus, and computer environment than the examples described above may be preferred for certain implementations. Therefore, the configuration of the signaling system and the computer system will vary from implementation to implementation depending upon numerous factors, such as price constraints, performance requirements, technological improvements, or other circumstances. Embodiments of the invention may also be applied to other types of software-driven systems that use different hardware architectures than those shown in the Figures.

While embodiments of the invention have been described in the context of an input/output hub chip coupled to microprocessors, memory, and other interconnects, embodiments of the invention may also be applied to a wide range of other devices capable of communicating over a point-to-point interconnect bus. In addition, embodiments of the invention may be applied to any device communications interface that transfers data bidirectionally with a communications interface. Embodiments of the invention may also be applied to a wide variety of components with simpler communications interfaces or test procedures In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various steps. The steps of the present invention may be performed by hardware components, such as those shown in the Figures, or may be embodied in machine-executable instructions, which may be used to cause general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program an agent or a computer system to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of machine-readable media suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

What is claimed is:

1. A method comprising:
receiving a packet from a source component within a multi-processor computing system at a first Transport Layer component, the packet containing protocol layer information and routing layer information, the routing layer information indicating a destination component;
attaching Transport Layer fields to the packet at the first Transport Layer component to form a transport layer packet, the fields including a Transport Layer Response field and a sequence number to identify the packet;
sending the packet using the Routing Layer across a second link within the computing system to a destination component through a second Transport Layer component the packet containing the Transport Layer fields, the protocol layer information and the routing layer information;
waiting to receive an acknowledgement of the sent packet at the first Transport Layer component from the second Transport Layer component, the acknowledgment including the sequence number of the sent packet, the acknowledgment providing an acknowledgment of a range of sent packets from the last acknowledged packet to the sent packet by using the sequence number of the sent packet; and;
if no acknowledgement is received then resending the sent packet with the same sequence number to identify the resent packet to the second Transport Layer component as resent to enable the second Transport Layer component to drop duplicate packets.

2. The method of claim 1, further comprising if a negative acknowledgment is received across the second link Transport Layer, then resending the packet.

3. The method of claim 1, further comprising, after resending the packet, repeating waiting to receive an acknowledgment of the resent packet and resending the packet until either an acknowledgement is received or the packet has been resent a specific number of times.

4. The method of claim 1, wherein attaching Transport Layer fields comprises attaching an identifier of the source processor.

5. The method of claim 1, wherein the sequence number is based on the sequence of packets received from the source processor.

6. The method of claim 1, further comprising buffering the received packet at the first Transport Layer component.

7. The method of claim 6, further comprising receiving an acknowledgement of the sent packet and then removing the packet from the buffer without resending.

8. A non-transitory machine-readable storage medium comprising instructions that when operated on by the machine cause the machine to perform operations comprising:
receiving a packet from a source component processor on a printed circuit board within a multi-processor computing system through traces on the printed circuit board at a first Transport Layer enabled component, the packet containing protocol layer information and routing layer information, the routing layer information indicating a destination component processor;
determining if the destination processor is connected through circuit board traces or through a cable; and
if through a cable, then, attaching Transport Layer fields to the packet at the first Transport Layer component to form a transport layer packet, the fields including a Transport Layer Response field and a sequence number to identify the packet; and
sending the packet using the Routing Layer across a second link including the cable within the computing system to a destination component processor through a second Transport Layer component the packet containing the Transport Layer fields, the protocol layer information and the routing layer information;
waiting to receive an acknowledgement of the sent packet at the first Transport Layer component from the second Transport Layer component, the acknowledgment including the sequence number of the sent packet, the acknowledgment providing an acknowledgment of a range of sent packets from the last acknowledged packet to the sent packet by using the sequence number of the sent packet; and;
if no acknowledgement is received then resendinq the sent packet with the same sequence number to identify the resent packet to the second Transport Layer component as resent to enable the second Transport Layer component to drop duplicate packets.

9. The medium of claim 8, wherein the operations further comprise buffering the packet until an acknowledgment is received from the second Transport Layer-enabled component.

10. The medium of claim 8, wherein the Transport Layer fields comprise an identification of the source processor.

11. A method comprising:
receiving a packet generated by a source processor at a receiver component across a component communications interface of a multi-processor computing system using a Routing Layer from a sender component, the packet containing the Routing Layer and a Protocol Layer, the components being microelectronic devices of the computer system:
determining whether the packet has a Transport Layer, the Transport Layer having fields including a Transport Layer Response field and a sequence number identifying the packet;
determining whether the packet is valid;
if the packet is valid, and has a Transport Layer then comparing the sequence number to earlier received packets to determine whether the packet is a duplicate to an earlier received packet and dropping the packet if it is a duplicate;

if the packet is valid, and has a Transport Layer then, using the Transport Layer, sending an acknowledgment to the sender component over the component communications interface, the acknowledgment being in a Transport Layer field of the acknowledgement, the acknowledgment including the sequence number of the packet, the acknowledgment providing an acknowledgment of a range of received packets from the last acknowledged packet to the packet by using the sequence number of the packet;

if the packet is valid and has a Transport Layer, then removing the fields of the Transport Layer from the packet and forwarding the packet to a destination processor over a second point-to-point link; and if the packet does not have a Transport Layer, then forwarding the packet to the destination processor without removing Transport Layer fields.

12. The method of claim 11, further comprising if the packet is not valid, then sending a negative acknowledgement to the sender component, the negative acknowledgment being in a Transport Layer field of the acknowledgment.

13. The method of claim 11, further comprising checking a sequence number of the packet Transport Layer fields to determine if the packet is a duplicate and if the packet is a duplicate, then dropping the packet.

14. The method of claim 11, wherein using the Transport Layer comprises determining an address for the sender component using the Transport Layer fields.

15. A multi-processor computing system comprising:
a source processor of the multi-processor computing system to generate a packet having protocol layer information and routing layer information and to send the packet over a first point-to-point link to a destination processor of the multi-processor computing system using a Routing Layer;
a first Transport Layer-enabled component of the multi-processor computing system to receive the packet over the first point-to-point link, to determine if there is a Transport Layer-enabled component in a second point-to-point link to the destination device, if there is a Transport Layer-enabled component, then to attach Transport Layer fields to the packet to form a transport layer packet, the Transport Layer having fields including a Transport Layer Response field and a sequence number identifying the packet, and to send the packet using the Routing Layer, if there is no Transport Layer-enabled component, then to send the packet using the Routing Layer without attaching Transport Layer fields;
a second Transport Layer-enabled component of the multi-processor computing system to receive the packet from the first Transport Layer-enabled component over the second point-to-point link, to check the packet and to forward the packet to the destination processor,
the second Transport Layer-enabled component sending an acknowledgement of the sent packet to the first Transport Layer-enabled component from the second Transport Layer-enabled component, the acknowledgment including the sequence number of the sent packet, the acknowledgment providing an acknowledgment of a range of sent packets from the last acknowledged packet to the sent packet by using the sequence number of the sent packet; and
if no acknowledgement is received at the first Transport Layer-enabled component then resendinq the sent packet with the same sequence number to identify the resent packet to the second Transport Layer-enabled component as resent to enable the second Transport Layer-enabled component to drop duplicate packets.

16. The system of claim 15, wherein the second Transport Layer-enabled component checks the packet by performing an error detection operation on the packet.

17. The system of claim 15, wherein the second Transport Layer-enabled component removes the Transport Layer fields before forwarding the packet to the destination processor.

18. The system of claim 15, wherein the first Transport Layer-enabled component is to buffer the packet until an acknowledgment is received from the second. Transport Layer-enabled component.

19. A Transport Layer-enabled component for use in a multi-processor computing system, the component to:
receive a packet over a first point-to-point link, the packet being generated by a source processor of the multi-processor computing system to be sent to a destination processor of the multi-processor computing system, the packet having protocol layer information and routing layer information;
determine if there is a second Transport Layer-enabled component in a second point-to-point link to the destination processor, if there is a second Transport Layer-enabled device, and if so then to attach Transport Layer fields to the packet to form a transport layer packet, the Transport Layer having fields including a Transport Layer Response field and a sequence number identifying the packet;
send the packet using the Routing Layer, or if there is no Transport Layer-enabled component, then send the packet using the Routing Layer without attaching Transport Layer fields to the second Transport Layer-enabled component of the multi-processor computing system that receives the packet from the first Transport Layer-enabled component over the second point-to-point link, checks the packet and forwards the packet to the destination processor;
to wait to receive an acknowledgement of the sent packet from the second Transport Layer component, the acknowledgment including the sequence number of the sent packet, the acknowledgment providing an acknowledgment of a range of sent packets from the last acknowledged packet to the sent packet by using the sequence number of the sent packet; and;
if no acknowledgement is received then to resend the sent packet with the same sequence number to identify the resent packet to the second Transport Layer component as resent to enable the second Transport Layer component to drop duplicate packets.

20. The Transport Layer-enabled component of claim 19, further to buffer the transport layer packet until an acknowledgment is received from the second Transport Layer-enabled component.

21. The Transport Layer-enabled component of claim 20, further to remove the transport layer packet upon receiving the acknowledgment.

22. The Transport Layer-enabled component of claim 19, further to:
buffer the transport layer packet;
wait to receive an acknowledgment of the sent packet across the Transport Layer of the second point-to-point link; and if no acknowledgment is received after a specific time interval, then reseed the transport layer packet from the buffer.

23. An apparatus comprising:
a transport layer enabled component coupled to a source processor on a printed circuit board within a multi-processor computing system through traces on the printed circuit board, the transport layer enabled component including but not limited to:
a transport layer protocol agent to attach Transport Layer fields to a received packet to form a transport layer packet, the Transport Layer fields including a Transport Layer Response field and a sequence number to identify the packet, the received packet being from the source processor and including protocol layer information and routing layer information; and
a routing layer protocol agent to transmit the transport layer packet towards a destination processor on a second printed circuit board through a cable,
the transport layer protocol agent waiting to receive an acknowledgement of the sent packet from the second transport layer enabled component, the acknowledgment including the sequence number of the sent packet, the acknowledgment providing an acknowledgment of a range of sent packets from the last acknowledged packet to the sent packet by using the sequence number of the sent packet, and if no acknowledgement is received then resendinq the sent packet with the same sequence number to identify the resent packet to the second transport layer enabled component as resent to enable the second transport layer enabled component to drop duplicate packets.

24. The apparatus of claim 23, wherein the sequence number is based on the sequence of packets received from the source component.

25. The apparatus of claim 23, wherein the routing layer transmits the transport layer packet through a point-to-point link that includes the cable and upon receiving an acknowledgement of the sent packet through the point-to-point link removes the packet from the buffer without resending.

\* \* \* \* \*